United States Patent Office 3,557,573
Patented Jan. 26, 1971

3,557,573
HIGHLY ELASTIC SHAFT COUPLING PARTICULARLY FOR USE IN CONNECTION WITH ELASTICALLY SUPPORTED DRIVING ENGINES
Klaus Hänsgen, Witten (Ruhr), Germany, assignor to Lohmann & Stolterfoht A.-G.
Filed Dec. 17, 1968, Ser. No. 784,320
Int. Cl. F16d *3/78*
U.S. Cl. 64—13          13 Claims

ABSTRACT OF THE DISCLOSURE

This application discloses a highly elastic shaft coupling wherein, in addition to at least one sleeve spring element comprising an inner ring mounted on one of the shafts to be coupled and having a conical outer surface, an outer ring placed concentrically of the inner ring and having a conical inner surface radially spaced from said outer surface, and a rubber-elastic layer placed between said conical surfaces, at least one disc spring element is provided, the latter comprising a primary disc connected to said outer ring, a secondary disc mounted on the second shaft, said discs having axially opposed and spaced surfaces, and a rubber-elastic layer placed between said axially opposed surfaces. This arrangement provides a combination of radial initial compression effected by the sleeve spring element with axial initial compression effected by the disc spring element when the coupling is axially compressed.

---

The invention relates to a highly elastic shaft coupling wherein the shafts to be coupled are directly or indirectly connected through at least one elastic sleeve spring element which comprises a rigid inner ring or primary ring, a rigid outer or secondary ring concentrically surrounding said inner ring, and a rubber-elastic intermediate layer connecting both rings, each sleeve spring element having conical binding surfaces of like conicity between the rigid rings and the intermediate layer connecting the rings. When in coupled position, because of axial stress, each sleeve spring element is initially radially compressed.

The purpose of couplings of the type set forth above is the elastic absorption of torsional vibrations. A particular advantage of such couplings is their capability of producing radial stress when the sleeve spring elements are axially stressed. The loading capacity of the coupling with respect to nominal torque as well as alternating moments superposing the nominal torque is increased due to the radial initial compression in the rubber-elastic intermediate layer.

A conventional structure of couplings as described supra is shown in FIG. 1 of the German Bundes-Gebrauchsmuster No. 1,865,324 wherein two shafts are elastically coupled by means of two mirror-symmetrically arranged and mutually stressed sleeve spring elements.

In another embodiment, shown in the German Bundes-Pat. No. 1,187,865 relating to a pressure fluid actuated double-cone friction clutch, each of the axially movable inner parts which are provided with outside cones is connected to the shaft, which is located inside the clutch, by means of a pair of mirror-symmetrically arranged and mutually stressed sleeve spring elements.

Each sleeve spring element of the clutch according to the German Bundes-Pat. No. 1,198,617 which is a continuation of the German Bundes-Pat. No. 1,187,865, is provided with more than one rubber-elastic intermediate layer on each sleeve spring element and the sleeve spring elements pair wisely associated with each movable inner part of the clutch are arranged symmetrically and not mirror-symmetrically.

A torsional spring element is shown in the German Bundes-Gebrauchsmuster No. 1,911,306 wherein one of the sleeve spring elements is combined with a disc spring element in parallel.

All aforementioned conventional couplings have a great torsional elasticity but only very little radial elasticity. It is therefore not advisable to use these couplings for connecting shafts which are considerably radially displaced during operation.

It is an object of the present invention to provide a shaft coupling or clutch having high torsional elasticity and permitting great relative radial displacement of the connected shafts. A temporary great radial displacement may occur, for example, when a resiliently supported prime mover is connected to a rigidly supported shaft.

It is an object of the invention to solve the problem of adapting approved, highly torque-elastic shaft couplings to the aforementioned operating conditions whereby as many as possible elements of the conventional couplings are retained without change.

This object is obtained by arrangement in series with and after the sleeve spring element or each group of parallel-connected sleeve spring elements of a disc spring element or a group of parallel-connected disc spring elements, each disc spring element comprising an annular rigid primary disc connected to a secondary ring or a plurality of combined secondary rings, a secondary disc placed axially opposite and spaced from the primary disc and directly or indirectly connected to or to be connected to the second shaft, and a rubber-elastic intermediate layer connecting both discs and being axially initially stressed when in coupled position.

Considering the tensions to be expected in the rubber elements when they are loaded, it is of advantage to take care that the width, i.e. the axial extension of the rubber-elastic intermediate layer of each sleeve spring element decreases at increasing diameter and the width or axial extension of the rubber-elastic layer of each disc spring element increases at increasing diameter.

Another characteristic feature of the invention is that the inner diameter of the elastic intermediate layer of each disc spring element is greater than the outer diameter of the secondary ring of the associated sleeve spring element. This design is preferably chosen when a short over-all length is desired and increase of the outside diameter of the coupling does not entail installation difficulties.

In a preferred embodiment of the invention two disc spring elements arranged in parallel relation are placed mirror-symmetrically after the sleeve spring element or after each group of parallel arranged sleeve spring elements. This arrangement permits imparting a desired initial axial tension to the pair wisely mounted disc spring elements which tension is independent of the axial tension of the sleeve spring elements.

The secondary disc of the disc spring elements may be adjacent. This facilitates mounting of the outwardly subsequent coupling elements.

It may also be desirable to form the cross section of the primary discs of the disc spring elements like the letter Z and so that, at the desired initial axial tension, the inwardly bent flanges are placed flatly upon each other.

The combination according to the invention of elastic elements can be utilized in a particularly simple manner in a coupling which cannot be disengaged whereby the secondary disc or discs are connected to a flange or housing connected to the second shaft.

The combination according to the invention, however, can be advantageously put to use in a clutch, particularly of the double cone-friction type. In this case the secondary discs are connected singly or in groups to the axially movable interior parts of the clutch which are provided with conical outside friction surfaces.

It is important, particularly if hollow spaces are formed by the groupwise combination of sleeve spring elements or disc spring elements, to avoid undue local heating of the rubber elements. For this reason said hollow spaces may be air-cooled according to the invention by providing suitable air channels.

The invention is not limited to the embodiments described infra. It comprises many other combinations whose selection depends on the individual operating conditions.

In many cases one of the aforedescribed basic forms may be selected; if, however, the loadability with respect to the nominal moment or the alternating moment or the radial deviations is predominant, the number of rubber-elastic elements is increased or the size of the elements is suitably increased.

The novel features which are characteristic of the invention are set forth with particularity in the appended claims. The invention itself, however, and additional objects and advantages thereof will best be understood from the following description of embodiments thereof when read in connection with the accompanying drawing, wherein:

Figure 1:
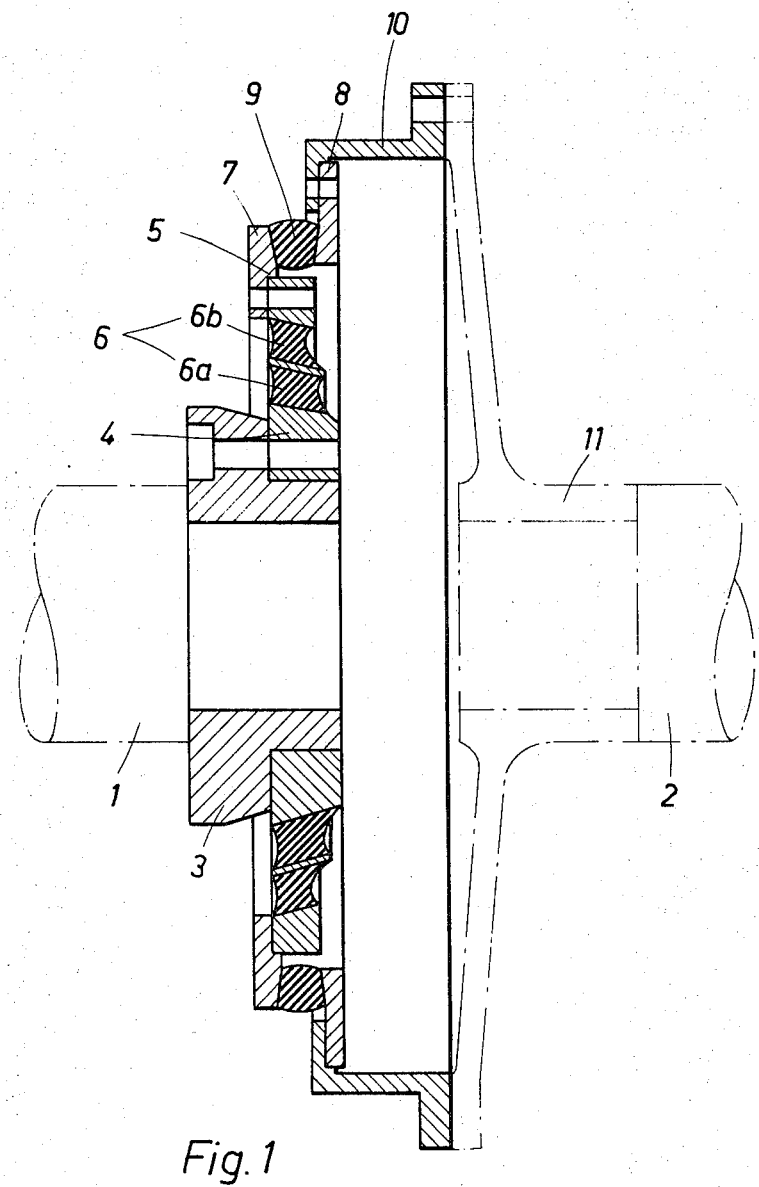
FIG. 1 is a schematic longitudinal sectional view of a simple coupling having a sleeve spring element and a disc spring element surrounding the sleeve spring element.

Referring more particularly to FIG. 1 of the drawing numerals 1 and 2 designate two shafts to be coupled. A flange hub 3 is rigidly connected to the shaft 1. A sleeve spring element comprising an inner ring 4, called primary ring and having a conical outer surface, an outer ring 5, called secondary ring and having a conical inner surface, and a rubber-elastic intermediate layer 6 connecting the primary ring 4 to the secondary ring 5, is centered on the flange hub 3 whereby the primary ring 4 is connected by means of screws to the flange of the hub 3. The intermediate layer 6 which tapers in the outward direction is subdivided by a conical intermediate sleeve into an inner portion 6a and an outer portion 6b. The rubber-elastic intermediate layer is vulcanized to the aforementioned conical surfaces. A disc spring element is arranged in series with and after the described sleeve spring element 4, 5, 6. The disc spring element consists of a rigid annular disc 7, called primary disc, a second rigid disc 8, called the secondary disc, placed axially opposite the primary disc, and of a rubber-elastic intermediate layer 9 connecting both discs. The secondary ring 5 and the primary disc 7 overlap in radial direction, a recess in the disc 7 effecting centering. Both parts are connected by means of screws. The connecting surfaces of the oppositely positioned discs 7 and 8 diverge outwardly. The secondary ring 8 covers the inwardly extending flange of a coupling housing element 10 in radial direction, the secondary ring 8 being bolted to the housing element 10. The latter is bolted to a flange hub 11 mounted on the shaft 2. The disc spring element 7, 8, 9 is so formed and arranged that the centers of the discs 7 and 8 can oscillate on the center line of the shaft 1 to the desired extent out of their normal position, during operation of the coupling. Since the sleeve spring element is highly torsion-elastic but little radial-elastic the occurring and permissible eccentricity of the primary disc 7 connected to the secondary ring is small. Because of the great radial elasticity of the disc spring element the eccentricity of the secondary disc 8 may be considerably greater than the eccentricity of the primary disc 7. A maximal eccentricity of 10 mm. and more is feasible, for example, with couplings for 800 kg. p.m.

Figure 2:
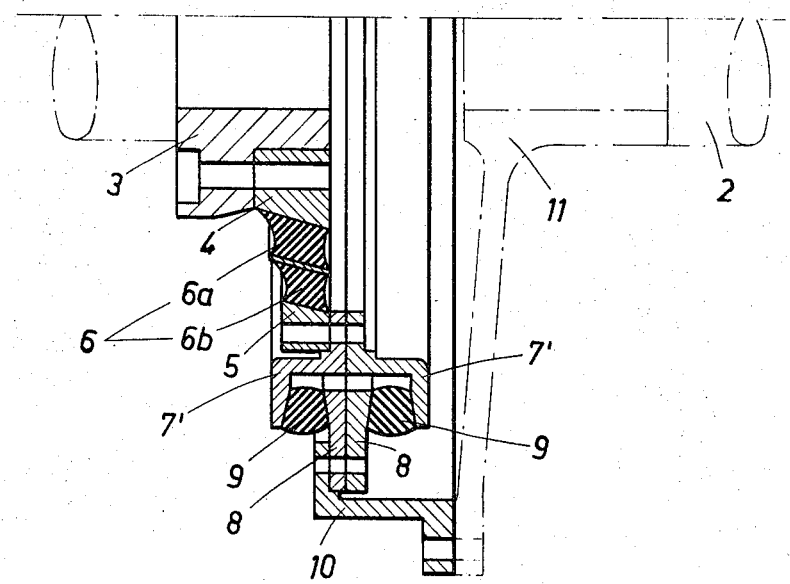
FIG. 2 is a schematic longitudinal sectional view of a coupling of the type shown in FIG. 1 provided with two disc spring elements.

The embodiment shown in FIG. 2 differs from that shown in FIG. 1 by the provision of an additional disc spring element. Two disc spring elements arranged in parallel relation and placed mirror-symmetrically comprise adjacent secondary discs 8, 8. The primary discs 7', 7' are bent so that their axial sections resemble the letter Z and are spaced prior to assembly of the coupling. When the primary discs 7', 7' are connected to the secondary ring 5 of the sleeve spring element the disc spring elements are initially axially compressed, as desired. When the coupling is assembled the inwardly oriented flanges of the primary discs are adjacent. The coupling according to FIG. 2 is radially stiffer than the one shown in FIG. 1. In both couplings the elastic elements can be demounted in radial direction without axial movement of the shafts.

Figure 3:
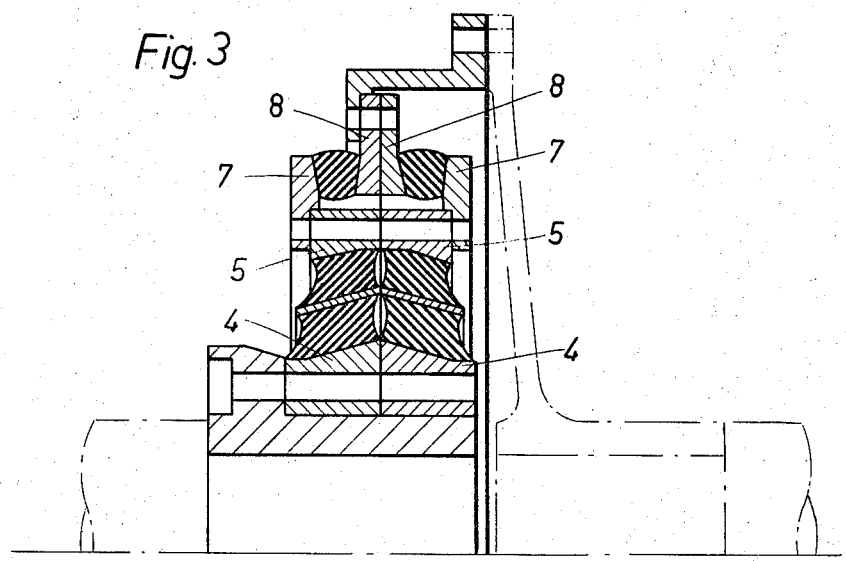
FIG. 3 is a schematic longitudinal sectional view of a modified coupling according to the invention wherein two sleeve spring elements are placed mirror-symmetrically and are followed by two disc spring elements.

In the embodiment of the invention shown in FIG. 3 the elastic elements of the coupling according to FIG. 1 are duplicated. Two sleeve spring elements are arranged in parallel and placed mirror-symmetrically. Their primary rings 4, 4 are adjacent prior to mounting of the disc spring elements whereas their secondary rings 5, 5 are axially spaced. When the bolts connecting the secondary rings 5, 5 to the primary discs 7, 7 are tightened the sleeve spring elements and the disc spring elements are simultaneously prestressed in axial direction. The secondary rings 5, 5 are placed between the flat primary discs 7, 7. This reduces the radial overall extension relative to the embodiment according to FIG. 2. Air channels, not shown, formed in spacer rings 4 and 4 and the rings 5 and 5, respectively, and bores in the discs 7, 7 leading to the outside permit change of the air in the cavities formed by the pairwise arrangement of the elastic elements.

Figure 4:
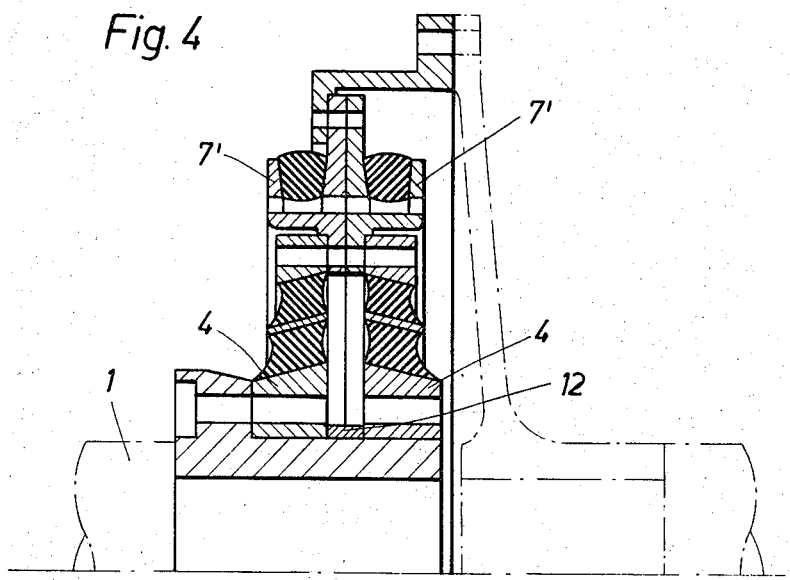
FIG. 4 is a schematic longitudinal sectional view of a coupling of the type shown in FIG. 3 but having the sleeve spring elements separated by a spacer ring.

In the embodiment shown in FIG. 4 which is similar to that shown in FIG. 3, two disc spring elements arranged in parallel are arranged after two sleeve spring elements which are arranged in parallel. Primary discs 7', 7' are bent as in FIG. 2 to form Z-shaped axial sections. In order to produce the required initial axial stress between the sleeve spring elements, a spacer ring 12 is placed between the primary rings 4. This provides a desirable distance between the rubber-elastic intermediate layers of the sleeve spring elements whereby the resulting cavity can be ventilated in conventional manner, not shown. The cavity between the pair wisely arranged disc spring elements is connected with the ambient air by means of bores in the primary discs 7', 7'.

Figure 5:
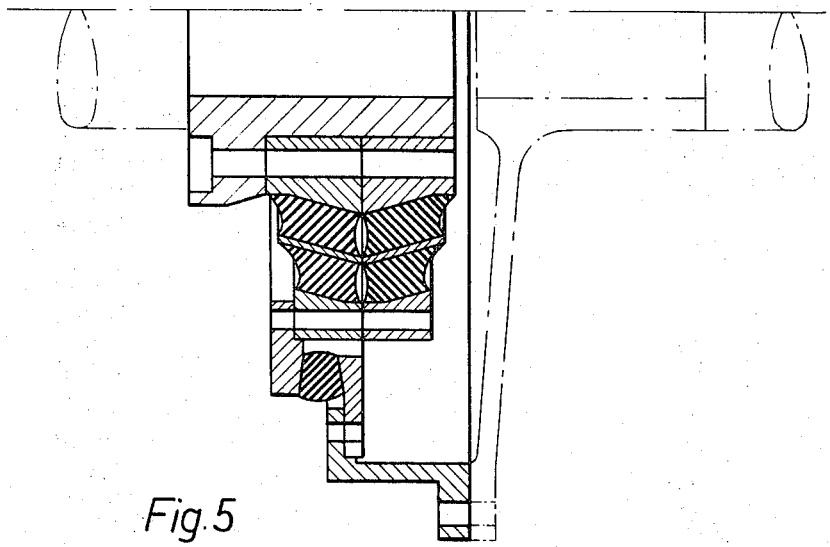
FIG. 5 is a schematic longitudinal sectional view of a coupling of the type shown in FIG. 3 having, however, only one disc spring element.

The couplings shown in FIGS. 4 and 5 have mutually stressed elastic elements so that no axial thrust is exerted on the shaft 2. In the variant shown in FIG. 5 a disc spring element is arranged after two sleeve spring elements which are arranged in parallel. The coupling according to FIG. 5 is stiffer with respect to torsion than the coupling according to FIG. 1.

Figure 6:
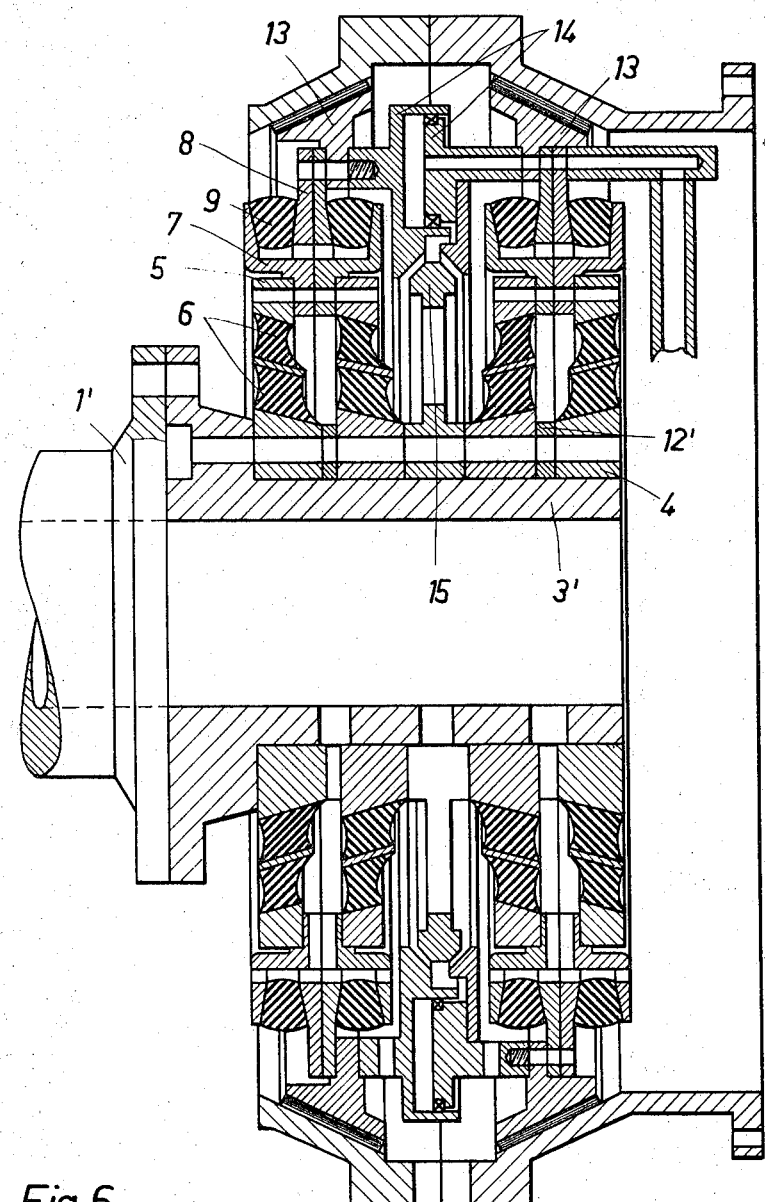
FIG. 6 is a schematic longitudinal sectional view of a double-tapered muff coupling generally using the arrangement shown in FIG. 4, the sleeve spring elements being pair wisely arranged, the elements of each pair being equally oriented, i.e. not mirror-symmetrically.

FIG. 6 illustrates the application of the invention to a highly elastic double-cone friction clutch which is actuated by a pressure fluid. Axially movable inner parts 13, 13 of the clutch which parts are provided at the outside with conical friction surfaces can be pneumatically axial moved by means of a piston-cylinder unit 14 toward conical friction surfaces at the inside of exterior or housing elements of the coupling. This movement is effected against the elastic force inherent in two groups of elastic elements, each group comprising two sleeve spring elements 4, 5, 6 arranged in parallel relation and two disc spring elements 7, 8, 9 arranged in parallel and in series with and after the sleeve spring elements 4, 5, 6. The elastic force is generated almost solely by the sleeve spring elements, the sleeve spring elements of each group being equally oriented, i.e. are not mirror-symmetric. When the clutch is disengaged conical surfaces of the axially movable inner parts 13, 13 of the clutch rest against a suitably shaped abutment 15 which is connected to a shaft 1'. Bores, not shown, in the flange hub 3' connected to the hollow shaft 1', in spacer rings 12' and in other parts permit forced ventilation of cavities in the clutch for cooling the rubber-elastic intermediate layers.

In order to facilitate conversion of conventional high torsion elastic couplings or clutches which are equipped only with sleeve spring elements, without substantial changes to couplings according to the invention which are highly radially elastic, the measurements of the connecting parts of the elastic elements and their graduations are so chosen that a conventional commercial sleeve spring element can be replaced by a sleeve spring element with a disc spring element arranged thereafter whereby the essential connecting measurements of such a combination are the same as those of the previously solely used sleeve spring element.

What is claimed is:

1. A highly elastic coupling for connecting two shafts, comprising an elastic sleeve-spring element having a rigid inner ring connected to one of the shafts, a rigid outer ring concentrically surrounding said inner ring, and a rubber-elastic intermediate layer connected to and connecting said two rings, said rigid rings and said intermediate layer having equally oriented conical connecting surfaces, whereby said sleeve-spring element is initially radially stressed due to axial stressing of said sleeve-spring element when the coupling is engaged, a disc-spring element arranged in series relation with and after said sleeve-spring element, said disc spring element comprising an annular rigid primary disc connected to said outer ring, a secondary disc spaced from and axially opposed to said primary disc and connected to the second shaft, and a rubber-elastic intermediate layer connected to and connecting said discs, whereby said last mentioned intermediate layer is initially axially stressed when the coupling is engaged.

2. A highly elastic coupling as defined in claim 1 comprising cavities adjacent said rubber-elastic intermediate layers, and means for ventilating said cavities for cooling said layers.

3. A highly elastic coupling as defined in claim 1 comprising flange means connected to and connecting said second shaft and said secondary disc.

4. A highly elastic coupling according to claim 3 wherein said flange means forms a housing for the coupling.

5. A highly elastic coupling as defined in claim 1 comprising a group of sleeve-spring elements arranged in parallel relation, said disc-spring element being arranged in series relation with and after said group.

6. A highly elastic coupling as defined in claim 1 comprising a group of disc spring elements arranged in parallel relation, said group being arranged in series relation with and after said sleeve-spring element.

7. A highly elastic coupling as defined in claim 1 comprising a group of sleeve-spring elements arranged in parallel relation and a group of disc-spring elements arranged in parallel relation, said group of disc-spring elements being arranged in series relation with and after said group of sleeve-spring elements.

8. A highly elastic coupling as defined in claim 1, wherein the axial extension of the intermediate layer of said sleeve-spring element decreases with increasing diameter of said sleeve-spring element and the axial extension of the intermediate layer of said disc-spring element increases with increasing diameter of said disc-spring element.

9. A highly elastic coupling as defined in claim 1, wherein the inner diameter of the elastic intermediate layer of said disc-sleeve element is greater than the outer diameter of said outer ring of the associated sleeve-spring element.

10. A highly elastic coupling as defined in claim 1 comprising two disc-spring elements arranged in parallel relation and placed mirror-symmetrically, said two disc-spring elements being arranged in series relation with and after said sleeve-spring element.

11. A highly elastic coupling according to claim 10 wherein said secondary discs are adjacent.

12. A highly elastic coupling according to claim 10 comprising a group of sleeve-spring elements arranged in parallel relation, two disc-spring elements arranged in parallel relation and placed mirror-symmetrically, said two disc-spring elements being arranged in series relation with and after said group of sleeve-spring elements.

13. A highly elastic coupling according to claim 10 wherein said primary discs have a substantially Z-shaped cross sectional configuration and have inwardly extending flanges resting on one another when the disc-spring elements are under the desired initial stress.

References Cited

UNITED STATES PATENTS

| | | | |
|---|---|---|---|
| 2,873,010 | 2/1959 | Alma | 64—11X |
| 3,245,229 | 4/1966 | Fadler | 64—11X |

JAMES A. WONG, Primary Examiner

U.S. Cl. X.R.

64—27